US010019255B1

(12) United States Patent
Greenfield et al.

(10) Patent No.: US 10,019,255 B1
(45) Date of Patent: Jul. 10, 2018

(54) INCREMENTAL SOFTWARE DEPLOYMENT IN A SERVICE ENVIRONMENT

(71) Applicant: Amazon Technologies, Inc., Reno, NV (US)

(72) Inventors: James Alfred Gordon Greenfield, Cape Town (ZA); Dirk Gerhardes Oberholster, Cape Town (ZA); Christopher Richard Jacques de Kadt, Cape Town (ZA); Jacob Adam Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/311,148

(22) Filed: Jun. 20, 2014

(51) Int. Cl.
*G06F 8/71* (2018.01)

(52) U.S. Cl.
CPC .................... *G06F 8/71* (2013.01)

(58) Field of Classification Search
CPC ......................................................... G06F 8/71
See application file for complete search history.

(56) References Cited

U.S. PATENT DOCUMENTS

| | | | | |
|---|---|---|---|---|
| 5,951,694 | A * | 9/1999 | Choquier | G06F 9/505 709/203 |
| 8,140,644 | B2 * | 3/2012 | Hagale | G06F 9/5061 709/219 |
| 8,438,253 | B2 * | 5/2013 | Szabo | G06F 8/67 709/220 |
| 8,606,922 | B1 * | 12/2013 | Greenfield | G06F 9/5027 709/226 |
| 8,719,804 | B2 * | 5/2014 | Jain | G06F 11/3006 717/117 |
| 9,436,525 | B2 * | 9/2016 | Illowsky | G06F 1/3203 |
| 2003/0140339 | A1 * | 7/2003 | Shirley | H04W 24/02 717/171 |
| 2004/0024853 | A1 * | 2/2004 | Cates | G06F 8/67 709/223 |
| 2006/0031420 | A1 * | 2/2006 | Ferguson | H04L 67/34 709/219 |
| 2006/0184930 | A1 * | 8/2006 | Fuente | G06F 8/65 717/168 |
| 2006/0190581 | A1 * | 8/2006 | Hagale | G06F 9/5061 709/223 |

(Continued)

OTHER PUBLICATIONS

Davis Chappell, Introducing the windows azure platform, [Online] Dec. 2009, David Chappell & Associates White Paper, [Retrieved from the Internet] <http://www.davidchappell.com/writing/white_papers/Introducing_Windows_Azure_v1.2--Chappell.pdf> 25 pages total.*

(Continued)

*Primary Examiner* — Hanh T. Bui
(74) *Attorney, Agent, or Firm* — Klarquist Sparkman, LLP (57) ABSTRACT

In a service provider environment, software deployments can be implemented by automatically routing an incrementally larger percentage of requests to a new software stack based on a success rate for previous requests. Thus, new and old versions of the software stack can be executed simultaneously with a small portion being routed to the new version until a sufficient number of requests have been handled. By slowly bringing a new software stack online, a confidence level in the new deployment can increase until it is fully deployed. Different success rates and different ramping rates can be used for each customer or based on different components of the request, such as API name, API parameters, location, etc. The software deployments can be extended to web-page requests.

16 Claims, 8 Drawing Sheets

(56) References Cited

U.S. PATENT DOCUMENTS

| | | | | |
|---|---|---|---|---|
| 2009/0007135 A1* | 1/2009 | Rathunde | ................. | G06F 8/65 |
| | | | | 718/107 |
| 2010/0299664 A1* | 11/2010 | Taylor | ............... | G06F 17/30377 |
| | | | | 717/173 |
| 2014/0298312 A1* | 10/2014 | Plax | ......................... | G06F 8/65 |
| | | | | 717/171 |

OTHER PUBLICATIONS

Vijay Rajagopalan, [Online] Sep. 15, 2011, [Retrieved from the Internet] <https://social.msdn.microsoft.com/Forums/azure/en-US/90f889ae-ec07-4f28-b22d-d2ca4dc91c2c/announcing-windows-azure-sdk-15-windows-azure-tools-for-microsoft-visual-studio-2010-and-new?forum=windowsazuredevelopment> 7 pages total.*

He et al., Next stop, the cloud: understanding modern web service deployment in EC2 and azure, [Online] 2013, In Proceedings of the 2013 conference on Internet measurement conference (IMC '13). ACM, New York, NY, USA, [Retrieved from the Internet] <http://doi.acm.org/10.1145/2504730.2504740> pp. 177-190.*

Mikle Wasson, Attribute Routing in asp.net Web API 2, [Online] Jan. 20, 2014, [Retrieved from the Internet] <http://www.asp.net/web-api/overview/web-api-routing-and-actions/attribute-routing-in-web-api-2> 12 pages total.*

Jie Dai et al., Collaborative Hierarchical Caching with Dynamic Request Routing for Massive Content Distribution, 2012, INFOCOM, retrieved online Mar. 14, 2018, pp. 1-9.Retrieved from the Internet: <URL: http://www.cs.sfu.ca/~jcliu/Papers/CollaborativeHierarchical.pdf>.*

* cited by examiner

| CUSTOMER IDENTIFIER 310 | API NAME 320 | API PARAMETERS 330 | LOCATION 340 | CURRENT RATE 142 | STACK ADDRESSES 350 | RAMP RATE ADJUSTMENT 160 | SUCCESS RATE 146 |
|---|---|---|---|---|---|---|---|
| CUSTOMER 1 | API 1 | PARAMETER SET 1 | LOCATION 1 | RATE 1 | STACK A STACK B | 10% FIRST 3 THEN 20% | 100% |
| | | PARAMETER SET 2 | LOCATION 2 | RATE 2 | | 15% FIRST 2 THEN 25% | 98% |
| | API 2 | PARAMETER SET 1 | | RATE 3 | | | 99% |
| | | | | RATE 4 | STACK C STACK D | 10% | 40% |
| CUSTOMER 2 | API 1 | PARAMETER SET 1 | LOCATION 1 | RATE 5 | STACK A STACK B | 5% FIRST 6 THEN 10% | 89% |

INCREMENTAL SOFTWARE DEPLOYMENT IN A SERVICE ENVIRONMENT

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Software updates in a cloud computing environment can be problematic. A typical model for deploying a new version of a service in the cloud computing environment can include stopping any ongoing execution of a current version, replacing the current version with the new version and then executing the new version. In such a scenario, the old version can be completely erased. Customers are sensitive to rolling out a new software deployment across all zones close in time as errors can cause large-scale outages of the customer's network. Additionally, rolling back upgrades due to errors or performance issues can be difficult and require significant downtown for the customer's hosted software.

DETAILED DESCRIPTION

In a service provider environment, software deployments can be implemented by automatically routing an incrementally larger percentage of requests to a new software stack based on a success rate for previous requests. Different success rates and different ramping rates can be used for each customer or based on different components of the request, such as API name, API parameters, location, etc. The software deployments can be extended to web-page requests, as well. In the event that the success rate is below a threshold, the new software stack can automatically see a reduction of requests until it is phased out.

Figure 1:
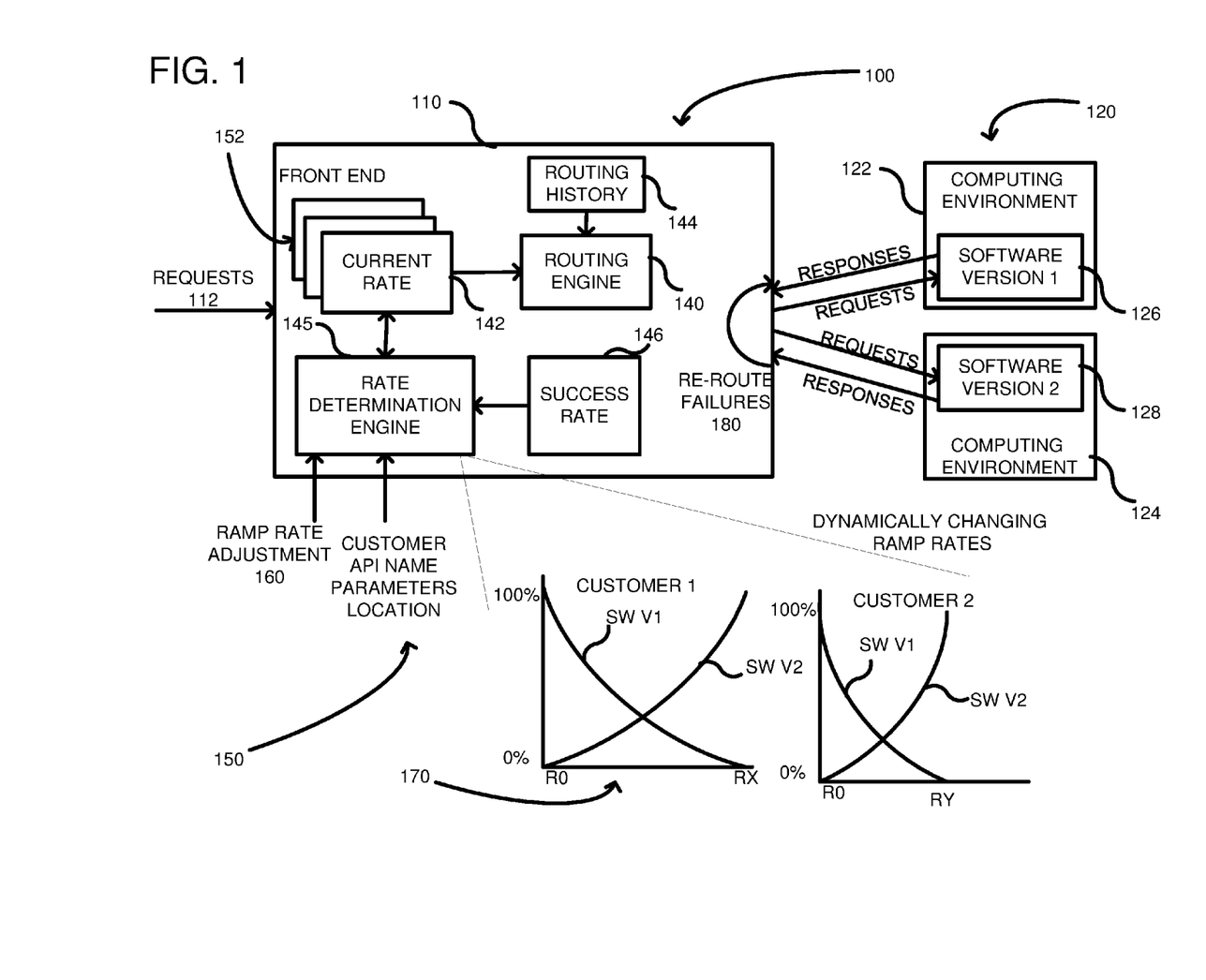
FIG. 1 is an example of a system for incrementally deploying software in a service environment.

FIG. 1 shows a system 100 including a front end 110 for receiving requests 112. The requests can come in a variety of formats and from a variety of sources. For example, the requests can be in the form of API requests, SMS requests, etc. Thus, the requests can be any format that solicits an automated response. Additionally, the request can be from an external client device (not shown) or can be a request internal to the system 100. In any event, the requests are routed to one or more computing environments 120 for servicing the request. The computing environments 120 are typically web services. Web services are commonly used in cloud computing and the system 100 can be a cloud environment. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. In some embodiments, the response can be sent back to the front end 110 for transmission back to the requestor.

As further described below, the computing environments 120 can include two or more computing environments 122, 124. In one example, each computing environment 122, 124 is a separate server computer available in the system 100. In other examples, the computing environments can be executed on multiple partitions of a same server computer. Each computing environment 122, 124 can execute a different software version 126, 128 used to respond to requests. Typically, the software version 2, shown at 128, and executing in computing environment 124, is an updated version of software version 1, shown at 126. However, software version 2 can be an older version of software version 1, for reinstating a prior version of code. In any event, both versions are designed to be alternative versions of the same software for responding to a same request. For example, an API request having a particular name can be sent to either software version 1 or 2 to receive a response to the API, as software version 2 can be nearly identical code to software version 1 with some updates to fix software bugs. In any event, software versions 1 and 2 can be software stacks, each of which includes a group of applications that work in sequence towards a common result or any set of utilities or routines that work as a group. Additionally, each computing environment can have a different address (e.g., IP address) associated therewith. Each software version and its associated computing environment can be considered a technology stack, which is a combination of software and hardware. In some embodiments, the software versions 126, 128 can be identical, but the overall technology stack has changed due to updated hardware. Furthermore, although two software versions 126, 128, are shown, there can be additional software versions (e.g., 3, 4, 5, etc.). Additionally, any number of computing environments can be used in association with the additional software versions.

The front end 110 can have logic therein for dynamically increasing or decreasing a percentage of requests that are routed to either computing environments 122, 124, which are both acceptable alternatives of each other. Specifically, the front end 110 can include a routing engine 140 that selectively routes requests 112 to either computing environment 122 or computing environment 124 as further described herein. In one embodiment, the routing engine 140 can automatically route an incrementally larger percentage of requests to the software version 2 based on a success rate seen thus far for previous of the same requests. In order to implement routing of a larger percentage of requests, the routing engine 140 reads a current rate 142 that specifies a percentage of requests that are to be transmitted to software version 2. Additionally, the routing engine 140 can read a routing history 144. The routing history 144 indicates how many requests have been previously sent to either version 1 or 2. Using the current rate 142 and history information 144, the routing engine 140 can calculate whether to send a request to either software version 1 or software version 2 so as to maintain the current rate 142. In a simple example, if the current rate is 10%, and the routing history indicates 9 out of the last 100 requests have been sent to software version 2, then the routing engine 140 can calculate using the routing history that historically 9% of the last 100 requests have been sent to software version 2. The historical routing number (9%) can be compared to the current rate 142. In this example, 9% is compared to 10%, and because the number of requests is below the current rate, the next request can be sent to software version 2 until the historical routing percentage equals the current rate. Likewise, if the historical routing number is greater than the current rate 142, then the next request can be sent to software version 1.

In some embodiments, the routing engine 140 need not analyze every request that is received in the front end, but can instead rout only a sample of the requests in accordance with the current rate 142 and the routing history 144. Additionally, although only one routing engine 140 is shown in FIG. 1, there can be multiple routing engines based on the design. For example, different routing engines can be located in different data centers.

The current rate 142 can be adjusted dynamically by a rate determination engine 145. The rate determination engine 145 can use one or more of a variety of input parameters in order to calculate the current rate 142. Foremost, a success rate 146 can be used. The success rate 146 provides a percentage of successful completions of requests sent to software version 2, shown at 128. Thus, each time a request is completed by software version 2, the request either has a success or failure indication and such information can be maintained by the front end 110 and stored in the success rate 146 as a percentage. For example, if 1 out of 10 requests had an error when sending the request to software version 2, then the success rate can be 90 percent. Alternatively, the success rate can be equated to a number of failures, so that in the above example, the success rate is 10%. In alternative embodiments, the success rate 146 can maintain something other than a percentage, such as a number of errors or a number of successes. The rate determination engine 145 can use the success rate 146 to increase or decrease the current rate 142. Typically, if the success rate of software version 2 is high, then the current rate can be adjusted incrementally and continually until it reaches 100%. Thus, the success rate 146 indicates a confidence level associated with deployment of software version 2. Once confidence has been established, a higher and higher percentage of requests can be routed to the software version 2. Once 100% is reached, all future requests can be sent to computing environment 124 and software version 2. Accordingly, software version 2 is then completely deployed and software version 1 can be removed. Future updates can then use computing environment 122 for deploying a new version of software.

The rate determination engine 145 can maintain a plurality of different current rates 152 based on different input parameters. For example, the current rates 152 can include a different current rate for each customer. Thus, the routing engine 140 can determine a customer associated with the current request 112 and read one of the current rates 152 associated with that customer (such as by using a customer identifier). Each customer can also have multiple current rates 152 associated therewith. For example, each API name can have a different current rate for each customer, or different uses of parameters associated with an API name can have different current rates, or different locations (geographic regions) associated with the request can have different current rates, etc. These parameters are shown collectively at 150. Furthermore, each of the above described parameters 150 can have a different ramp rate adjustment160 associated therewith. The ramp rate adjustment 160 is a rate of increase for the current rate if the success rate is favorable. The ramp rate can be predefined levels, such as 10%, 20%, 50%, 100%. Alternatively, the ramp rate adjustment 160 can be dictated by a function, such as linear or non-linear functions.

Different example ramp rates 160 are shown for different customers at 170. As can be seen, customer 1 shows that the requests to software version 1 (SW V1) ramps down from 100% as software version 2 (SW V2) ramps up to 100%. The ramping can be based on a number of received requests, RX. Thus, an amount of time needed to fully deploy the new software can be associated with the number of requests received. As can be seen, customer 2 has a more aggressive ramp rate wherein SW V2 is deployed at 100% after a number of request RY, wherein RY is less than RX. (The graphs are identically scaled to illustrate that customer 2 is more aggressively ramping requests routed to the second software version).

As shown at 150, the front-end 110 can include a mechanism for re-routing failed requests. For example, a request sent to software version 2 that has an error can have the request re-routed 180 to software version 1. Such re-routing can be transparent to the requestor. A single response can be transmitted back to the requestor so that the requestor is not provided any indication that the request to software version 2 failed.

In some embodiments, deployment of software version 2 might be problematic, such that a large number of errors occur. In such a case, the routing engine 140 can decrease a percentage of requests that are sent to software version 2. For example, if the success rate is 10%, the rate determination engine 145 can decrease the current rate to 0% so that all requests are routed to software version 1. Alternatively, the rate determination engine 145 can maintain a relatively low rate in response to the success rate being below a threshold level. After a threshold period of time at a low rate, the rate determination engine 145 can send an alert to an administrator that the deployment is unsuccessful. Thus, a variety of techniques can be used to determine that the deployment is unsuccessful and requests can thereafter be routed to the software version 1.

Figure 2:
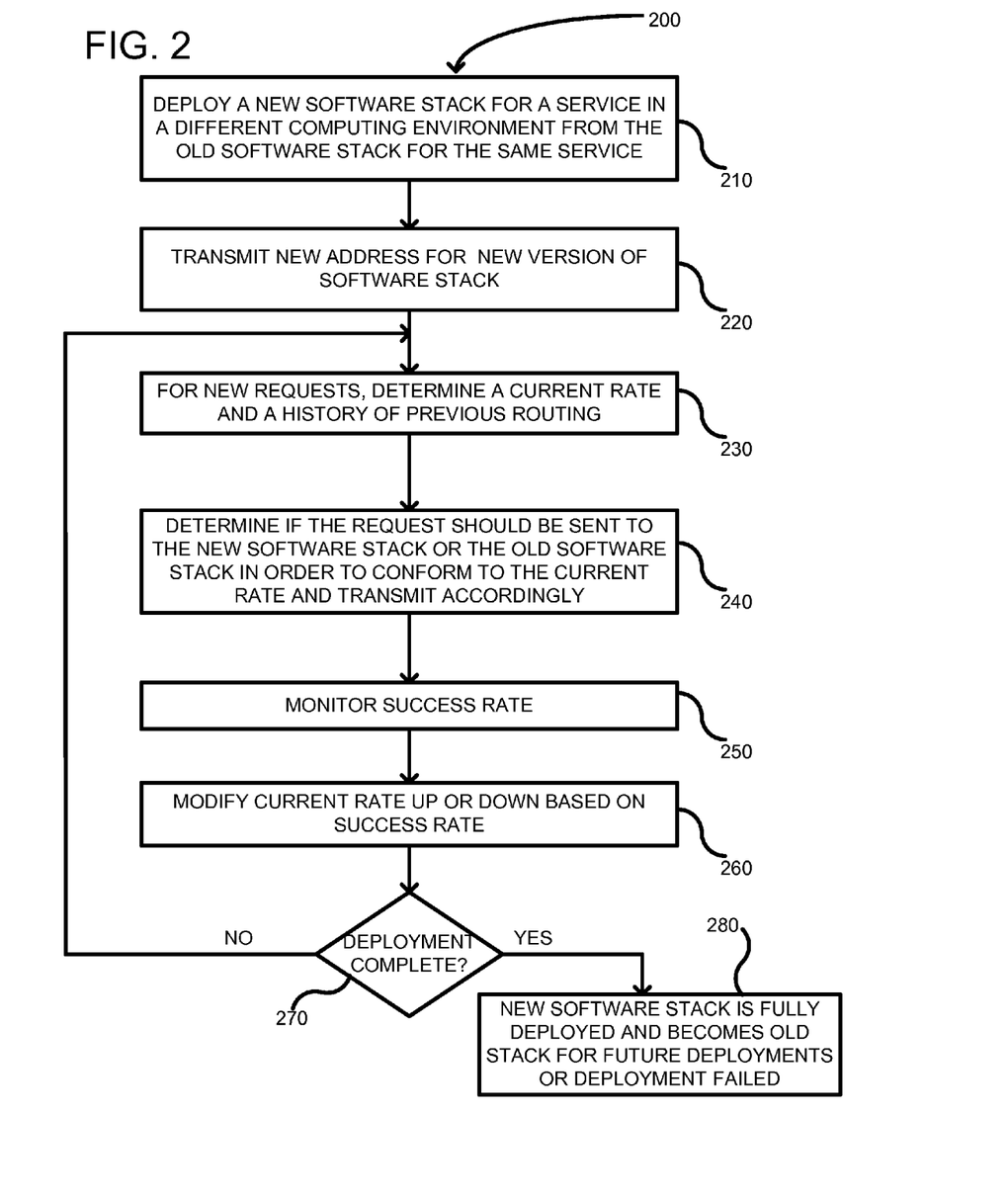
FIG. 2 is a flowchart of a method according to one embodiment for implementing the incremental deployment of FIG. 1.

FIG. 2 is a flowchart 200 of an embodiment for deploying software. In process block 210, a new software stack for a service can be deployed in a different computing environment from the old software stack. Thus, both software stacks for the same service operate simultaneously and service requests for that service are sent to one or the other software stack based on a current percentage rate. In process block 220, a new address for the new software stack is transmitted to the front end or some other location accessible by the routing engine 140 (see FIG. 1). The routing engine 140 uses the new address to begin sending at least a percentage of requests to the new software stack. Typically, the new address is an IP address of the computing environment 124, such as the IP address for a server computer. The transmission of the new address can be performed manually or automatically using any desired means. In process block 230, for new requests received on the front end, a current rate and a history of previous routing is determined. In process block 240, a determination is made whether a request should be sent to the new software stack or the old software stack. The determination is made, at least in part, based on conforming to the current rate. For example, the routing engine 140 can use history information 144 and the current rate 142 to determine whether the request should be forwarded to the new software stack or old software stack. Once the determination is made, the routing engine forwards the request to the appropriate software stack.

In process block 250, a rate of success is monitored. For example, the front end 110 can receive back any error messages and/or success messages from the software stacks and make a determination of the rate of success based on a number of total requests. Thus, the rate of success is calculated and stored in a memory location, such is shown at 146 (FIG. 1) based on the monitored success/error messages received back from the software stacks. In process block 260, a current rate is modified up or down based on the success rate. Thus, if the success rate is indicative of a successful deployment (e.g., a low number of errors) for the new software stack, then the current rate transferred to the new software stack can be increased. Alternatively, if the success rate is indicative of an unsuccessful deployment (larger than a threshold percentage of errors), then the current rate can be decreased and even placed at zero percent to turn off the new deployment. The rate determination engine can be designed such that the current rate is only adjusted after a predetermined number of requests have been processed (e.g., 100). In decision block 270, a check is made whether the deployment is complete. For example, if the current rate is 100%, then the current deployment can be considered complete and the new software stack is fully deployed (process block 280). In such a case, the old stack can be used for future deployments. Alternatively, if the current rate is lowered downwardly to 0%, then the deployment is considered to have failed (also shown in process block 280). If decision block 270 is answered in the negative, the process continues in a loop at the start of process block 230. The process continues in a loop until the deployment is complete or fails.

Figure 3:
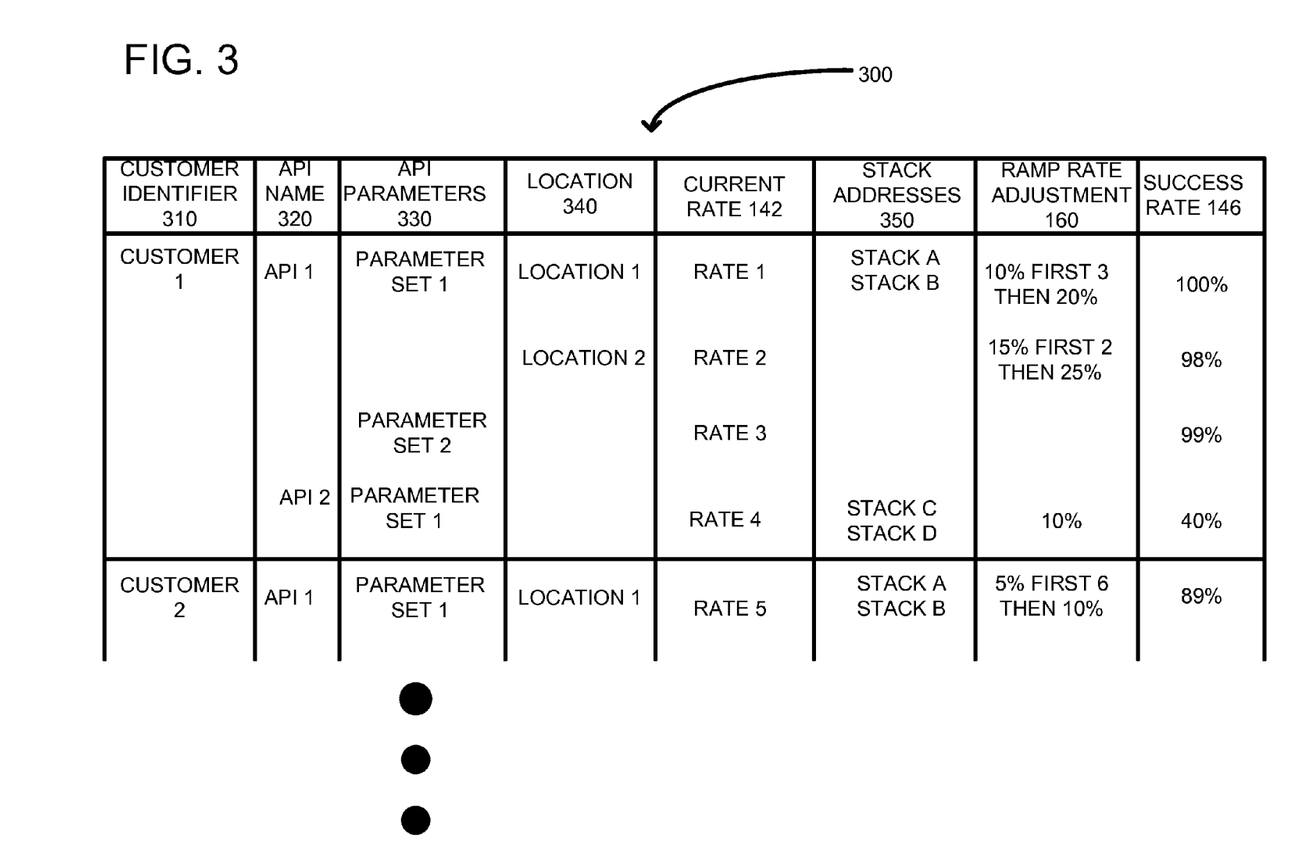
FIG. 3 is an embodiment of a table that can be used for dynamically adjusting rates based on API-associated components.

FIG. 3 is a table 300 that can be read by the front end to perform some of the operations described above. For example, the table 300 can include multiple fields, some of which can be found in FIG. 1. The fields can include a customer identifier field 310, an API name field 320, an API parameters field 330, a location field 340, the current rate field 142, a stack addresses field 350, the rate adjustment field 160, and the success rate field 146. The customer identifier 310 can be used when the system 100 includes multiple customers (any desired number) and the service provider associates a unique identifier with each customer. Notably, customer 1 has a plurality of APIs associated therewith. Although only API 1 and API 2 are shown, any number of APIs can be associated with each customer. The API name field 320 is an identifier that distinguishes one API from another. Typically, the API names are words describing the service to be performed. The API parameters 330 are parameters associated with the APIs. Each API can have any number of parameters. As an illustration API 1 under customer 1 is shown with 2 parameter sets, shown generically as parameter set 1 and parameter set 2. The location field 340 can be associated with the location of the requestor or with the location where the API is being performed. For example, the API can possibly be performed in different geographic regions (countries, states, etc.) and the location is associated with the geographic region. The current rate field 142 shows that each customer can have multiple different rates associated therewith. The rates can be a percentage number, such as 10%. And further, each API associated with a customer can have a different rate. And still further, each parameter set associated with an API can have a different rate. And finally, each location can have its own rate. All of the above-described rates are shown in the current rate field 142. Although only 5 rates are shown (Rate 1-5), any number of rates can be used. The stack address field 350 identifies an IP address associated with each stack. Typically, each API has its own two stacks associated therewith. Thus, API 1 is associated with Stack A and Stack B, while API 2 has a different two stacks C and D.

The ramp rate adjustment 160 describes different adjustments that can be made to the current rate 142. Thus, when an adjustment is to be made, it can be made in accordance with the ramp rate adjustment field 160. The adjustments 160 are shown to be different based on customer, API name, API parameters, and location. Additional fields can be added so that the rates can be tracked and adjusted based on the parameters associated therewith. The adjustments can be based on functions, such as linear functions, non-linear functions, step functions (e.g., increasing by a constant amount for each increase), etc. Finally, a success rate field 146 is shown and is calculated by the front end based on successful processing of requests by the software version 2 and the total requests processed by the software version 2. Other success rates can be computed, such as by using failure rates of software version 2, for example. The table 300 can be stored in a memory location within the front end 110 or external to the front end in a database. Additionally, the table can be divided and different fields associated therewith can be stored in different locations.

Although not shown, the table 300 can also include a ramp rate adjustment for decreasing a percentage of requests that are routed to the updated version. The decreasing rate can be different or the same as the ramp rate adjustment 160 Like the ramp rate adjustment 160, the rate of decrease can be different based on customer, API name, API parameters, location, etc.

Thus, a prescribed ramping plan is implemented using the table 300 that can vary the rate based on a variety of inputs.

Figure 4:
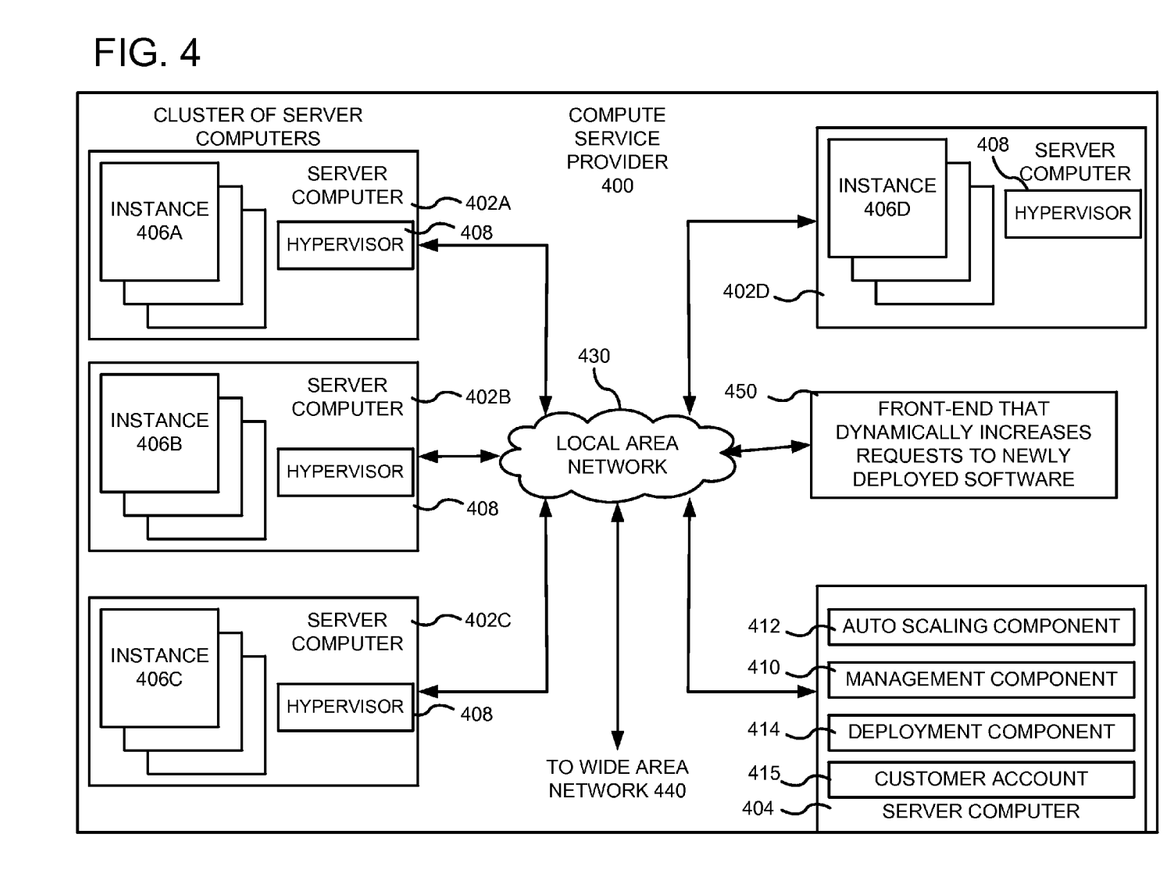
FIG. 4 is an embodiment of a compute service provider in which the incremental deployment can occur.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

As further described below, the deployment component 414 can also be used to deploy updates to services, such as software version 2 (FIG. 1).

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. The customer account can also include information associated with the ramp rate adjustment 160. For example, the customer account can have control information describing a quantity of adjustment and for which of the fields shown in table 300.

A network 430 can be utilized to interconnect the server computers 402A-402D and the server computer 404. The network 430 can be a local area network (LAN) and can be connected to a Wide Area Network (WAN) 440 so that end users can access the compute service provider 400.

A front-end component 450 can be located within the compute service provider 400 and used to perform the methods described herein. In particular, the front-end 450 can dynamically increase a percentage of new requests that are routed to newly deployed software. The percentage increase can be based on a success rate of how the newly deployed software is handling requests. For example, if the success rate is above a threshold level, then an increase can be initiated which corresponds with the ramp adjustment rate. The front-end component can also decrease a percentage of requests that are routed to the newly deployed software if the success rate is below a threshold level.

It should be appreciated that the network topology illustrated in FIG. 4 has been simplified and that many more networks and networking devices can be utilized to interconnect the various computing systems disclosed herein.

Figure 5:
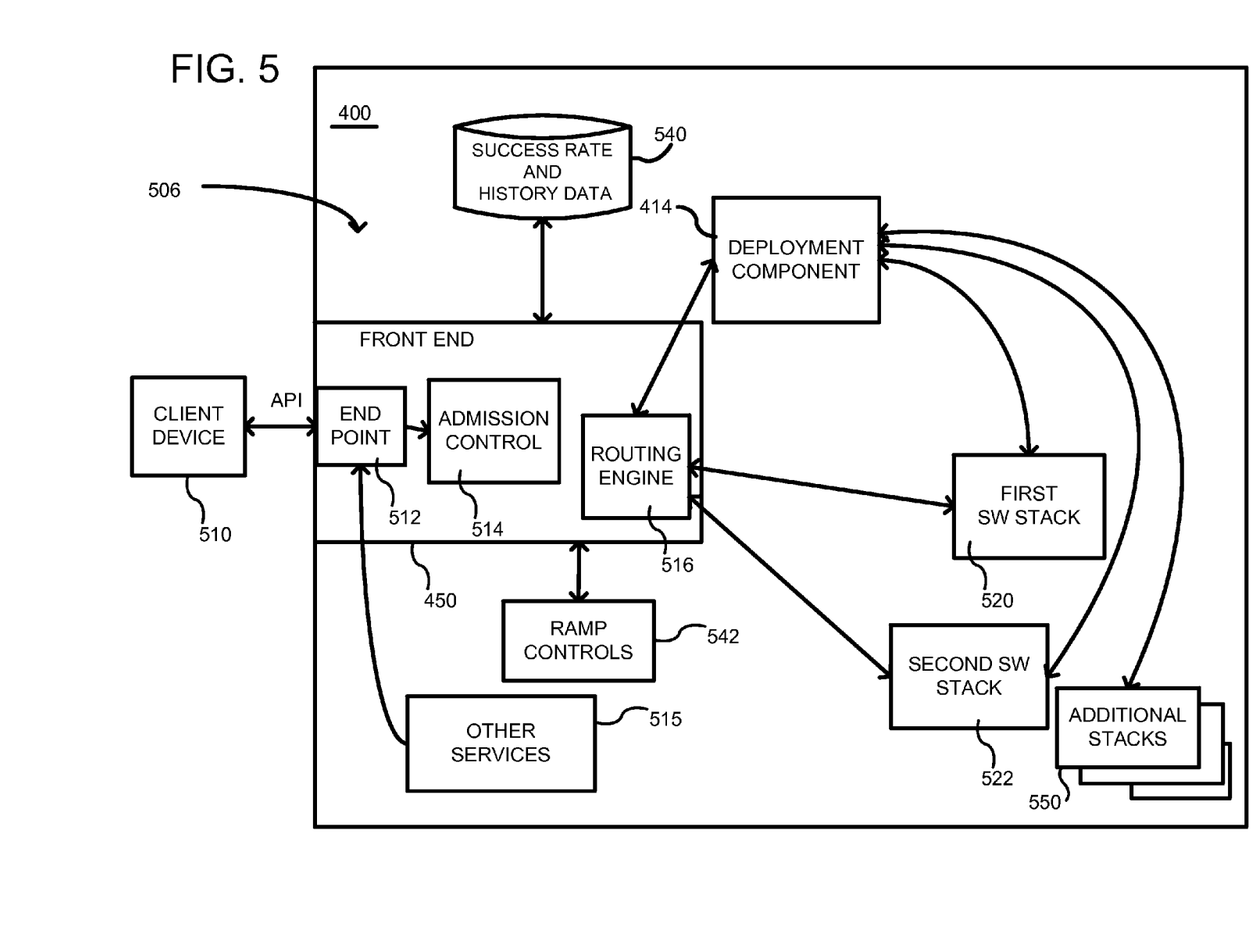
FIG. 5 shows further details of an example system including a plurality of management components associated with a control plane.

FIG. 5 illustrates in further detail management components 506 that can be used in the multi-tenant environment of the compute service provider 400. In order to generate requests, a client device 510 can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 400, can likewise make API requests to the end point 512. The end point 512 can be within the front end 450. Also within the front end 450 can be an admission control 514, e.g., one or more computers operating together as an admission control web service. The admission control 514 can authenticate, validate and unpack the API requests for service or storage of data within the compute service provider 400. The admission control 514 can also be external to the front end. A routing engine 516 can be within the front end 450 and selectively routes API requests from the client device 510 or the other service 515 to the first software stack 520 or the second software stack 522, which are alternative versions of substantially the same software. Additional stacks 550 can be used and can include any number of versions of the same software. Selection by the routing engine can be based on rate and history data obtained from database 540. The rate history data can be associated with the routing history (how many requests have already been sent to the second software stack) and the history of the success rate. The selection by the routing engine 516 can also be based on ramp controls 542 which can include a current rate and any ramp rate adjustments to be performed.

Finally, the deployment component 414 can be used to load software into the first or second software stacks 520, 522. Once the software stacks are ready to be executed, the deployment component can transmit an IP address to the routing engine 516. The IP address is used to identify a location of the first and second software stacks 520, 522. Alternatively, other communication techniques can be used to populate the stack address field 350 from the table 300. For example, the deployment component can send a message to an administrator, who can manually populate the table 300. Thus, any desired push or pull schemes can be used.

Figure 6:
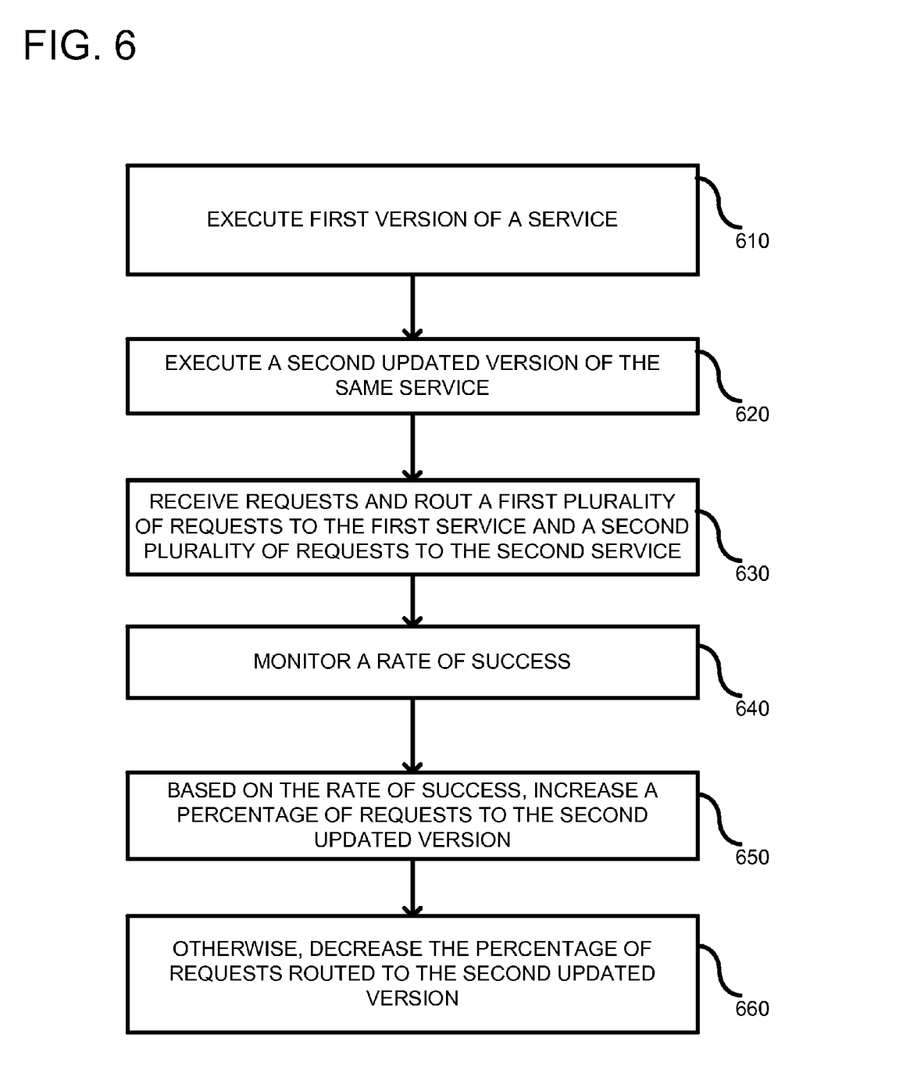
FIG. 6 is a flowchart of a method according to a first embodiment for implementing the incremental deployment.

FIG. 6 is a flowchart of a method according to one embodiment for deploying a software update. In process block 610, a first version of a service is executed. The service can be executed in a computing environment, such as on a server computer. In process block 620, a second updated version of the service is executed. Like the first service, the second updated version of the service can be executed in a computing environment, which is typically a separate server computer from the first version of the service. Both the first version of the service and the second version of the service are executed simultaneously and can both respond to the same API request. For example, both the first and second versions can be associated with the same API name and the second version can be the same as the first version but include recent updates. Alternatively, the second version can be identical code as the first version but executing on an updated platform, such as a faster server computer.

In process block 630, requests are received, such as API requests. Each API request that can be handled by the first version of the service can also be handled by the second version of the service. Thus, a front end must selectively choose which service to forward the request. Accordingly, the front end routs a first plurality of the requests to the first service and a second plurality of requests to the second service. In process block 640, a rate of success is monitored. For example, the front end can track whether there was an error in servicing the request or whether the request was serviced successfully (without error). Other error reporting mechanisms can be used to monitor the rate of success. The same service can have multiple different success rates that are tracked based on different parameters, such as different customer identifiers, different API request types (e.g., different API names), different locations, etc.

In process block 650, based on a rate of success, a percentage of requests forwarded to the second updated version of the service can be changed, such as through incrementally increasing the percentage rate. The increase can follow a linear function, a non-linear function, or a step function. Typically, a non-linear function accelerates the percentage increase as a confidence level in the second updated version of the software grows. The confidence level can be a combination associated with the routing history and the success rate and can be calculated by the front end. Thus, if a number of requests processed by the second version of the service exceeds a threshold amount and the success rate exceeds a threshold amount, then the confidence level can be high. A high confidence level can result in a more aggressive increase of requests routed to the second version of the service. In process block 660, if the rate of success is indicative of an unsuccessful deployment, then the percentage of requests routed to the second updated version of the service can be decreased. For example, a low confidence level because of a low success rate is an indication that the deployment has too many errors and should be pulled offline. The rate of decrease can be the same as the rate of increase or it can be different. Typically, the rate of decrease is more aggressive than the rate of increase meaning the rate of decrease is more rapid.

Figure 7:
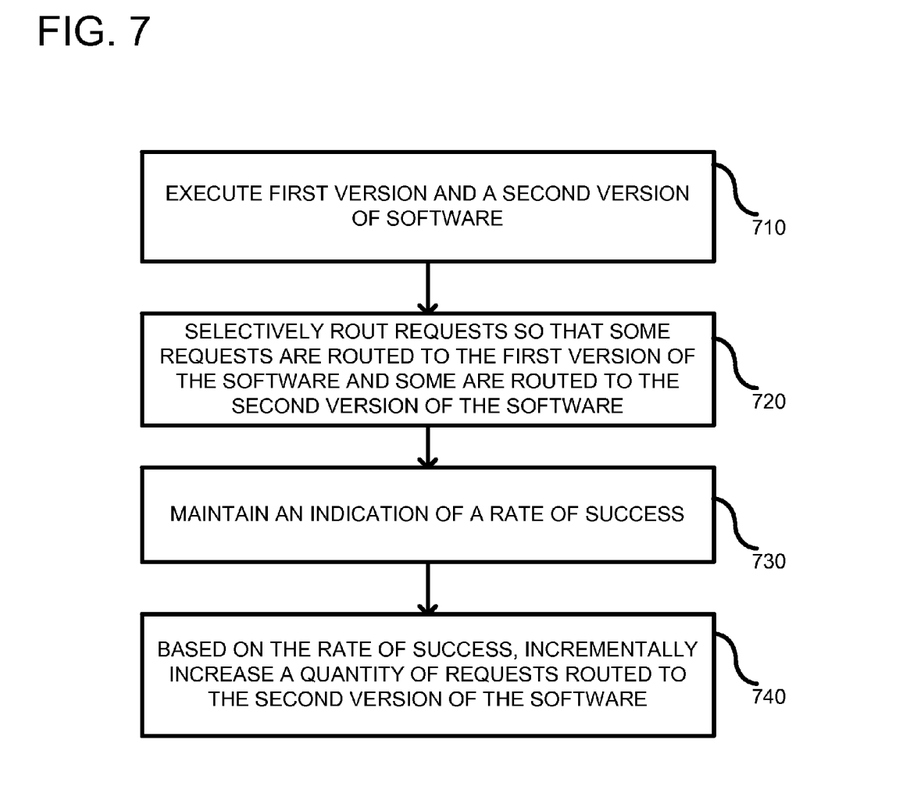
FIG. 7 is a flowchart of a method according to another embodiment for implementing the incremental deployment.

FIG. 7 shows a flowchart of a method for deploying software. In process block 710, a first version and a second version of the software are executed. The different versions are alternative versions of the same software and either can be used to respond to a same request. Thus, to a user of the software making the request, both the first and second versions can look identical. Indeed, in some embodiments the first and second versions are identical but are running on different hardware platforms. Thus, the overall technology stack (which includes a hardware platform and the software thereon) associated between the first and second software differs in some aspect. In some embodiments, the software can be a service, such as a service in a compute service provider and the requests can be API requests. Alternatively, the service can be a web page. In process block 720, requests are selectively routed so that some of the requests are forwarded to the first version of the software, and some are forwarded to the second version of the software. For example, the routing engine 140 can make the selection which software version to forward the request based on a current rate parameter 142 and prior routing history data 144. Thus, the routing engine can read a currently scheduled percentage of requests that are to be routed to the second version of the software (e.g., the current rate parameter 142) and use routing history data 144 to determine which of the first and second versions of software to send the request. In process block 730, an indication of a rate of success can be maintained. There are a variety of techniques that can be used to maintain the rate of success. For example, a rate of success can be maintained for the version of the software that is being deployed by maintaining a simple count of a number of successful responses, or unsuccessful responses. The simple count can be used in conjunction with the total number of requests made, such as is maintained by the routing history 144, to calculate an overall success rate.

In process block 740, based on the success rate, the current rate 142 can be incrementally increased so that a quantity of requests routed to the second version of the software increases. Typically, the incremental increasing is performed by comparing the rate of success to a threshold rate and performing the incremental increase if the rate of success exceeds the threshold rate. The rate of increasing can vary depending on the customer. Additionally, the amount of increase can be different for APIs having different names. Still further, the rate of increasing can be different for different parameter settings of the API requests. In another example, the rate of increase can be different based on a geographic location associated with the request. Thus, any of the above parameters can be used to separately track the current rate 142 and the ramp rate adjustment 160. Additional parameters can be used based on the design.

Figure 8:
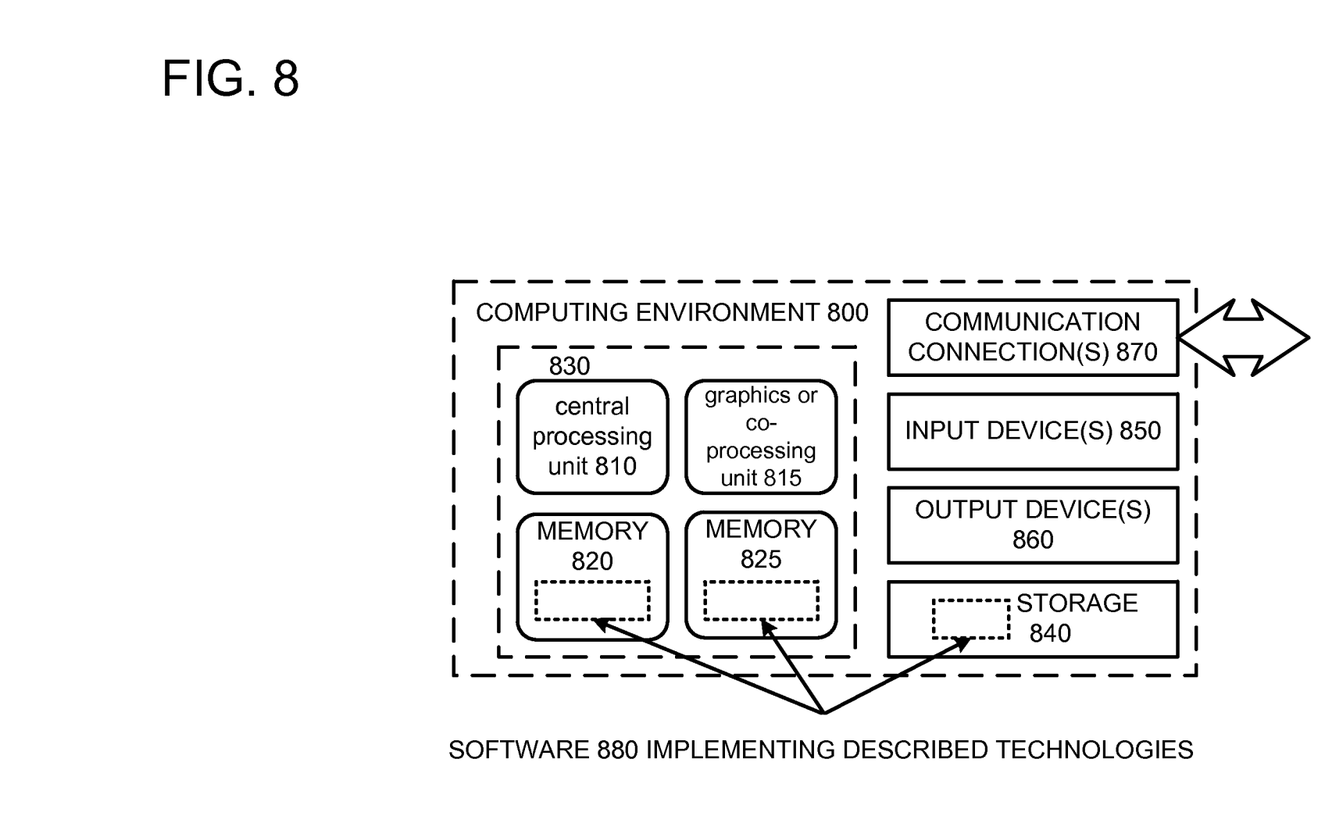
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of deploying a software update of a service in a service environment, comprising:
   executing a first version of the service in the service environment, the first version of the service executing in a first computing environment having a first address;
   executing a second updated version of the service in the service environment, the second updated version of the service executing in a second computing environment having a second address, the second updated version being the software update of the first version, wherein both the first version and the second updated version are alternative active versions of a same software;
   receiving requests in the service environment and routing a first plurality of the requests to the first version of the service, at the first address, and a second plurality of the requests to the second updated version of the service, at the second address;
   monitoring a rate of success of at least the second plurality of requests that were routed to the second updated version of the service, the rate of success being based on whether the second plurality of requests are completed by the second updated version of the service; and
   based on the rate of success, dynamically increasing a percentage of the requests that are routed to the second updated version of the service, at the second address, if the rate of success is indicative of a successful deployment of the software update;
   further including receiving a failure on one of the first plurality of requests using the second updated version of the service and re-routing the failed request automatically to the first version of the service.

2. The method of claim 1, further including maintaining multiple rates of success and monitoring the multiple rates of success separately based on separate customer identifiers associated with the requests.

3. The method of claim 1, wherein the requests are API requests, and further including monitoring multiple rates of success separately based on different API request types.

4. The method of claim 1, further including dynamically modifying a rate at which the requests are routed to the second updated version depending on a confidence level of the software update.

5. A computer-readable storage, which is non-transitory, including instructions thereon causing a computing system programmed thereby to perform a method of deploying software, comprising:
   executing at least a first version of software and a second version of the software, the first and second versions being alternatives that can be used to respond to a same request, wherein the first version executes in a first computer environment having a first address associated therewith and the second version executes in a second computer environment having a second address associated therewith;
   in response to receiving a plurality of requests, selectively routing the requests so that some of the requests are routed to the first version of the software using the first address and some of the requests are routed to the second version of the software using the second address so that both the first version and the second version are alternative versions that are simultaneously active, further including receiving an indication that one of the requests routed to the second version of software was unsuccessful and further including automatically re-routing the request to the first version of the software;
   maintaining an indication of a rate of success for handling the requests based on the requests that are successfully completed for at least the second version of the software; and
   based on the maintained rate of success, incrementally increasing a quantity of the selectively routed requests to the second version of the software at the second address.

6. The computer-readable storage of claim 5, where the first version of software and second version of software are alternative versions of a service in a multi-tenant environment and the requests are API requests.

7. The computer-readable storage of claim 6, wherein a rate of increasing the quantity is different for different named APIs.

8. The computer-readable storage of claim 6, wherein a rate of incrementally increasing the quantity is different for different parameter settings of API requests.

9. The computer-readable storage of claim 5, wherein a rate of incrementally increasing is different for different customers making the requests.

10. The computer-readable storage of claim 5, wherein a rate of incrementally increasing is different based on a location of the second version of the software.

11. The computer-readable storage of claim 5, wherein the first and second versions are a same software executing on different platforms or the second version is an updated version of the first version.

12. The computer-readable storage of claim 5, wherein incrementally increasing the quantity of selected routed requests to the second version of the software includes comparing the rate of success to a threshold rate and performing the incremental increase if the rate of success exceeds the threshold rate.

13. The computer-readable storage of claim 5, wherein selectively routing includes reading a currently scheduled percentage of requests that are to be routed to the second version of the software, and using routing history data to determine which of the first version and second versions of software to send a current request.

14. A system for deploying software, comprising:
- a first computing environment including a first software stack having a first network address associated therewith;
- a second computing environment including a second software stack having a second network address associated therewith;
- a memory storing a current rate for distributing requests between the first and second computing environments, a routing history associated with a past distribution of requests between the first and second computing environments, and a success rate associated with successful completion of requests performed by the second computing environment;
- a routing engine coupled to the memory for reading the current rate and the routing history and for determining which of the first and second computing environments to forward a next request, wherein the routing engine is for detecting an unsuccessful processing of a request to the second computing environment and automatically re-routing the request to the first computing environment; and
- a rate determination engine coupled to the memory for reading the success rate and for dynamically changing the current rate based on a success rate, wherein the rate determination engine is for progressively increasing a percentage of requests routed to the second computing environment until the second software stack is fully deployed and wherein both the first computing environment and second computing environment are alternative versions for receiving requests.

15. The system of claim 14, wherein the current rate is a first current rate and further including maintaining multiple current rates based on one or more of the following: a customer identifier, an API name, parameters associated with an API, and a location associated with the request.

16. The system of claim 14, wherein the first computing environment and second computing environment are on different server computers.

* * * * *